(12) United States Patent
Suzuki et al.

(10) Patent No.: US 12,492,911 B2
(45) Date of Patent: Dec. 9, 2025

(54) MAP COLLECTION SYSTEM, MAP SERVER DEVICE, IN-VEHICLE DEVICE AND MAP COLLECTION METHOD

(71) Applicant: Mitsubishi Electric Corporation, Chiyoda-ku (JP)

(72) Inventors: Toshiharu Suzuki, Chiyoda-ku (JP); Yasunari Goto, Chiyoda-ku (JP)

(73) Assignee: Mitsubishi Electric Corporation, Chiyoda-ku (JP)

(*) Notice: Subject to any disclaimer, the term of this patent is extended or adjusted under 35 U.S.C. 154(b) by 34 days.

(21) Appl. No.: 16/756,602

(22) PCT Filed: Nov. 19, 2018

(86) PCT No.: PCT/JP2018/042687
§ 371 (c)(1),
(2) Date: Apr. 16, 2020

(87) PCT Pub. No.: WO2019/102968
PCT Pub. Date: May 31, 2019

(65) Prior Publication Data
US 2020/0278215 A1    Sep. 3, 2020

(30) Foreign Application Priority Data
Nov. 22, 2017  (JP) ................. 2017-224464

(51) Int. Cl.
*G01C 21/36* (2006.01)
*H04W 4/48* (2018.01)

(52) U.S. Cl.
CPC ....... *G01C 21/3638* (2013.01); *G01C 21/367* (2013.01); *G01C 21/3676* (2013.01); *H04W 4/48* (2018.02)

(58) Field of Classification Search
CPC .............. G01C 21/3638; G01C 21/367; G01C 21/3676; G01C 21/3804; G01C 21/26; H04W 4/48; G08G 1/0112; G01S 19/45
See application file for complete search history.

(56) References Cited

U.S. PATENT DOCUMENTS 9,689,700 B1 * 6/2017 Gross ................. G01C 21/3632
2007/0195094 A1  8/2007 Adachi
(Continued)

FOREIGN PATENT DOCUMENTS

EP   3 032 221 A1   6/2016
EP   3 299 763 A1   3/2018
(Continued)

OTHER PUBLICATIONS

International Search Report issued on Jan. 29, 2019 in PCT/JP2018/042687 filed on Nov. 19, 2018.
(Continued)

*Primary Examiner* — Rami Khatib
(74) *Attorney, Agent, or Firm* — Oblon, McClelland, Maier & Neustadt, L.L.P.

(57) ABSTRACT

A map server device (200) transmits mapping software to an in-vehicle device (300) mounted on a measurement vehicle. The in-vehicle device receives the mapping software, acquires measurement data obtained by the measurement vehicle, generates map data by executing the mapping software by using the acquired measurement data as an input, and transmits the generated map data to the map server device. Then, the map server device receives the map data.

5 Claims, 14 Drawing Sheets

(56) References Cited

U.S. PATENT DOCUMENTS

| | | | | |
|---|---|---|---|---|
| 2008/0262721 | A1* | 10/2008 | Guo | G01C 21/3819 701/532 |
| 2009/0077266 | A1* | 3/2009 | Alrabady | G07C 5/008 709/249 |
| 2009/0140887 | A1* | 6/2009 | Breed | G01C 21/1656 701/116 |
| 2012/0310468 | A1* | 12/2012 | Wong | G01C 25/00 701/29.9 |
| 2014/0073254 | A1* | 3/2014 | Ichihara | H04W 76/14 455/41.2 |
| 2014/0309833 | A1 | 10/2014 | Ferguson et al. | |
| 2015/0127239 | A1* | 5/2015 | Breed | G01S 19/13 701/70 |
| 2015/0355640 | A1 | 12/2015 | Ferguson et al. | |
| 2016/0161265 | A1 | 6/2016 | Bagheri | |
| 2017/0176996 | A1 | 6/2017 | Ferguson et al. | |
| 2018/0224285 | A1* | 8/2018 | Stajner | G09B 29/004 |
| 2018/0373910 | A1 | 12/2018 | Sato et al. | |
| 2019/0049990 | A1* | 2/2019 | Jafari Tafti | G01C 21/26 |
| 2019/0051153 | A1* | 2/2019 | Giurgiu | G01C 21/3691 |
| 2019/0073210 | A1 | 3/2019 | Sano | |
| 2019/0087169 | A1 | 3/2019 | Arai | |
| 2019/0114162 | A1 | 4/2019 | Izumi | |
| 2019/0120964 | A1* | 4/2019 | Luo | G01C 21/3819 |
| 2019/0129710 | A1 | 5/2019 | Izumi | |
| 2019/0258261 | A1 | 8/2019 | Ferguson et al. | |
| 2019/0392708 | A1 | 12/2019 | Tsuda et al. | |
| 2020/0109954 | A1* | 4/2020 | Li | G01C 21/3848 |

FOREIGN PATENT DOCUMENTS

| | | |
|---|---|---|
| JP | 11-15839 A | 1/1999 |
| JP | 2003-242580 A | 8/2003 |
| JP | 2009-222572 A | 10/2009 |
| JP | 2011-117740 A | 6/2011 |
| JP | 2016-200472 A | 12/2016 |
| JP | 2016-224503 A | 12/2016 |
| JP | 2017-83619 A | 5/2017 |
| JP | 2017-90239 A | 5/2017 |
| JP | 2018-5894 A | 1/2018 |
| WO | WO 2005/088584 A1 | 9/2005 |
| WO | WO 2016/185637 A1 | 11/2016 |
| WO | WO 2017/110801 A1 | 6/2017 |
| WO | WO 2017/150059 A1 | 9/2017 |

OTHER PUBLICATIONS

Extended European Search Report issued Dec. 16, 2020 in European Patent Application No. 18881632.6, 9 pages.
European Office Action Issued Jan. 4, 2022 in European Patent Application No. 18 881 632.6, 10 pages.

* cited by examiner

MAP COLLECTION SYSTEM, MAP SERVER DEVICE, IN-VEHICLE DEVICE AND MAP COLLECTION METHOD

TECHNICAL FIELD

The present invention relates to collection of map data.

BACKGROUND ART

Dynamic maps have been developed and maintained for expressways since fiscal 2015.

A dynamic map is a high-precision three-dimensional map including dynamic information, semi-dynamic information, semi-static information and static information.

The static information of the dynamic map identifies lanes of roads with an accuracy of several centimeters to several tens of centimeters.

A vehicle compatible with a dynamic map is capable of automated driving.

Sensors such as a camera and a radar, etc. are mounted on the vehicle. Then, the information obtained by each sensor is compared with the information (information such as lanes and road objects, etc.) obtained from the dynamic map. This makes it possible to recognize an accurate position of the vehicle. As a result, the control performance of automated driving is improved.

Patent Literature 1 discloses a form of control over automated driving by using a dynamic map.

In preparation for popularization of self-driving vehicles in the future, it is necessary to develop and maintain a dynamic map for ordinary roads.

Patent Literature 2 discloses a form of maintenance of a dynamic map.

In the mobile mapping system (MMS), three-dimensional point cloud information of roads is collected by a measurement vehicle, and linearized data of roads and features is obtained from the three-dimensional point cloud information. Then, based on the obtained linearized data, a dynamic map is generated. The generated dynamic map is distributed to map companies and automobile companies.

In order to proceed with improvement of the dynamic map, it is necessary to have the measurement vehicle travel a long distance.

The subject matter according to Patent Literature 3 is to report that when high-precision map data is not provided for a part of a guide route, a part exists in the guide route where automated driving is impossible.

The aim of the subject matter according to Patent Literature 3 is to eliminate an uncomfortable feeling of a driver that is caused in a situation where an area for which high-precision map data is maintained, and an area for which high-precision map data is not maintained are mixed.

Such an uncomfortable feeling is eliminated when improvement of dynamic maps for ordinary roads is promoted.

Patent Literature 4 discloses a technique to improve efficiency of a partial update operation of data for map display.

In order to promote popularization of dynamic maps, it is necessary to simplify the update operation of the dynamic maps.

Patent Literature 5 discloses a method to improve convenience of a user in displaying guidance information at the time of route search. Specifically, guidance information to guide featured areas along with routes are displayed. This makes it possible for the user to select various actions during travel time from a departure point to a destination, such as to drop by a featured area that does not exist on the route.

It is regarded as necessary to improve convenience of users also for improvement of dynamic maps.

Patent Literature 6 discloses a method to display point cloud images representing roads and the periphery of roads based on measurement data obtained by a measurement vehicle.

CITATION LIST

Patent Literature

Patent Literature 1: WO2017-150059 A
Patent Literature 2: WO2017-110801 A
Patent Literature 3: JP 2016-200472 A
Patent Literature 4: WO2005-088584 A
Patent Literature 5: JP2009-222572 A
Patent Literature 6: WO 2016-185637 A

SUMMARY OF INVENTION

Technical Problem

The present invention is aimed at making it possible to provide map data from an in-vehicle device of a measurement vehicle to a map server device.

Solution to Problem

A map collection system according to the present invention includes a map server device, and an in-vehicle device that is mounted on a measurement vehicle.

The map server device includes:
a software distribution unit to distribute, to the in-vehicle device, mapping software to generate map data based on measurement data obtained by the measurement vehicle, and
a map data acquisition unit to acquire, from the in-vehicle device, the map data generated by the mapping software.

The measurement vehicle includes:
a software acquisition unit to acquire the mapping software from the map server device;
a measurement data acquisition unit to acquire the measurement data obtained by the measurement vehicle;
a map data generation unit to generate map data by executing the mapping software by using the acquired measurement data as an input, and
a map data provision unit to transmit the generated map data to the map server device.

Advantageous Effects of Invention

According to the present invention, it is possible to provide map data from an in-vehicle device of a measurement vehicle to a map server device.

DESCRIPTION OF EMBODIMENTS

Figure 1:
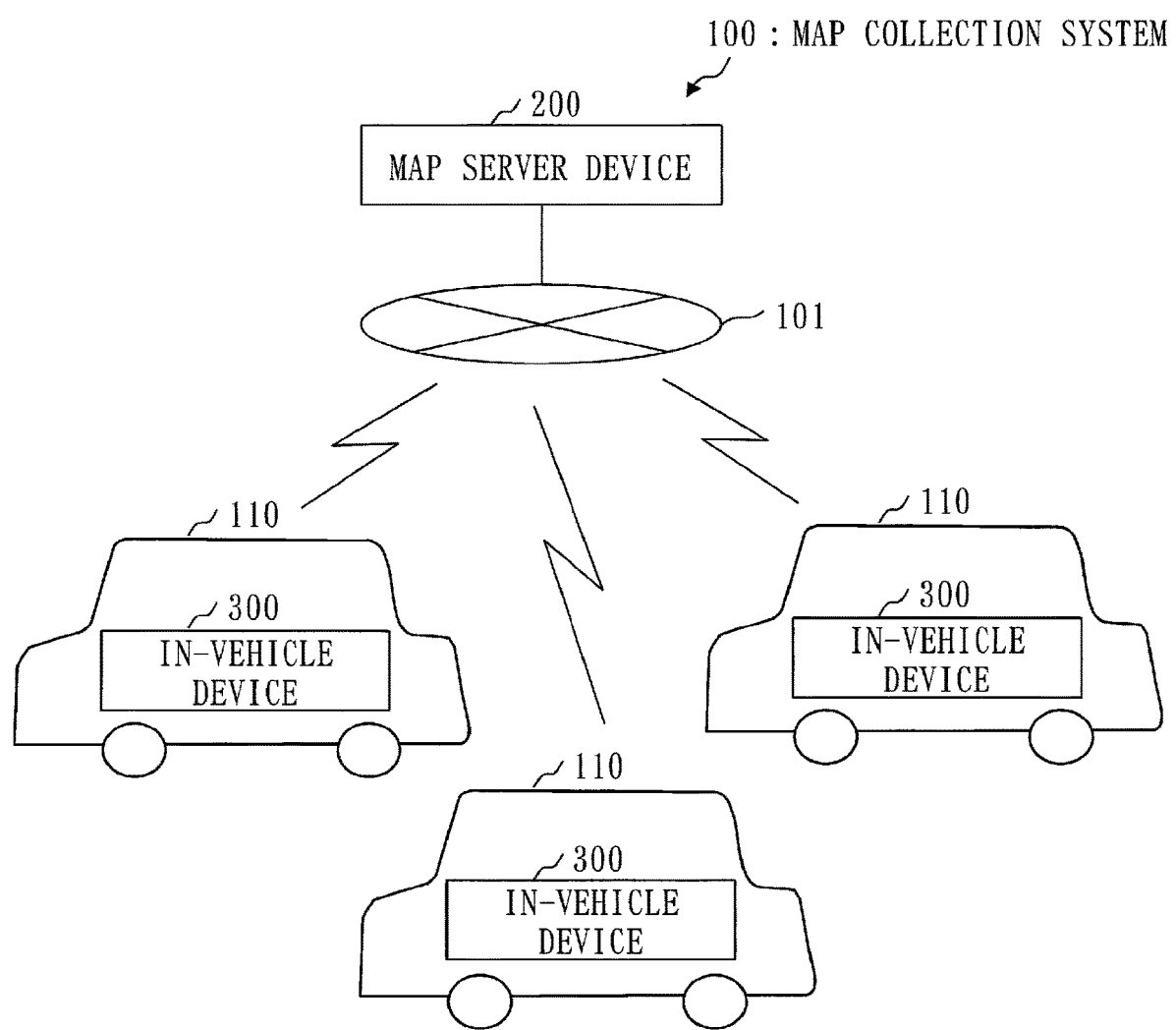
FIG. 1 is a configuration diagram of a map collection system 100 according to a first embodiment.

In embodiments and diagrams, same elements and corresponding elements are denoted by the same reference numerals. Explanation for the elements with the same reference numerals will be omitted or simplified appropriately. Arrows in the diagrams mainly illustrate flows of data or flows of processing.

First Embodiment

Explanation will be provided of a map collection system 100 based on FIG. 1 through FIG. 7.

Explanation of Configuration

Based on FIG. 1, the configuration of the map collection system 100 will be described.

The map collection system 100 includes a map server device 200 and in-vehicle devices 300.

The map server device 200 and the in-vehicle devices 300 of each measurement vehicle 110 communicate with one another via a network 101. The network 101 is specifically the Internet.

The in-vehicle devices 300 are mounted on measurement vehicles 110.

The measurement vehicles 110 are vehicles used in the mobile mapping system (MMS), which measure roads in each area.

However, any vehicles may be the measurement vehicles 110 as far as they are equipped with measurement functions, and the measurement vehicles 110 need not be vehicles dedicated to the mobile mapping system. For example, the measurement vehicles 110 may be private cars or transporting vehicles. The transporting vehicles are vehicles for transporting at least any of goods or passengers. One example of the transporting vehicles is a taxi, a bus or a home delivery vehicle.

Based on FIG. 2, the configuration of a measurement vehicle 110 will be described.

The measurement vehicle 110 is provided with a top board 119. The top board 119 is situated at the roof of the vehicle. Further, the measurement vehicle 110 includes an odometer 114.

Various types of sensors are attached to the top board 119. Specifically, a positioning reinforcement signal receiver 111, a positioning signal receiver 112, an inertial measurement device 113 and a laser scanner 115 are attached to the top board 119.

The positioning reinforcement signal receiver 111 receives positioning reinforcement data from a GNSS satellite, a terrestrial wireless LAN, or a mobile phone line. GNSS is an abbreviation for Global Navigation Satellite System.

The positioning reinforcement data has an accuracy of a centimeter class, which is used for measuring a position of the measurement vehicle 110 with a high degree of accuracy.

The positioning reinforcement data is distributed from the GNSS satellite. Otherwise, the positioning reinforcement data is distributed from a GNSS correction information distribution service provider via a mobile telephone network.

When the GNSS satellite being a quasi-zenith satellite distributes the positioning reinforcement data, the positioning reinforcement data is included in signals of L6 band, which indicates an error of a satellite clock of each GPS satellite, an orbit error of each GPS satellite, an inter-frequency bias, an error of ionospheric propagation delay and an error of tropospheric delay. GPS is an abbreviation for Global Positioning System.

The positioning signal receiver 112 receives a positioning signal transmitted from a positioning satellite, and measures a position of the measurement vehicle 110 by using a reception result of the positioning signal. The data obtained by positioning is called positioning data. The GPS satellite is one example of the positioning satellite.

The positioning data indicates a position of the measurement vehicle 110 measured by the positioning signal receiver 112.

The inertial measurement device 113 includes a gyroscope and an acceleration sensor. The gyroscope measures angles and angular velocities in three-axial directions of the measurement vehicle 110. The acceleration sensor measures acceleration rates in the three-axial directions of the measurement vehicle 110. The angles in the three-axial directions indicate an elevation angle, a rotation angle and an azimuthal angle.

The data obtained by the inertial measurement device 113 is called inertial measurement data.

The odometer 114 measures a travel distance of the measurement vehicle 110.

Specifically, the odometer 114 detects vehicle speed pulses which are output every time a wheel of the measurement vehicle 110 rotates, and calculates the travel distance by integral calculation using the rotating radius of a tire and the rotation amount of the wheel.

The data obtained by the odometer 114 is called travel distance data.

The laser scanner 115 performs laser measurement.

In the laser measurement, the laser scanner 115 emits a laser beam while rotating a laser emission surface at a speed of about 100 rotations per second. Then, the laser scanner 115 calculates distances and directions for each point at which the laser beam is reflected.

The point at which the laser beam is reflected is called a measurement point.

Specifically, the laser scanner 115 measures a time from an emission time of a laser beam until a reception time of the laser beam, and calculates a distance to a measurement point by using the measured time. The emission time is a time when the laser beam is emitted, and the reception time is a time when the laser beam that is reflected at the measurement point is received. The azimuth of the measurement point is an angle at which the laser beam is emitted.

The data obtained by the laser scanner 115 is called azimuth-distance data.

The data obtained by the several types of sensors mounted on the measurement vehicle 110 is called measurement data.

Specifically, the positioning reinforcement data, the positioning data, the inertial measurement data, the travel distance data and azimuth-distance data are collectively called the measurement data.

Figure 3:
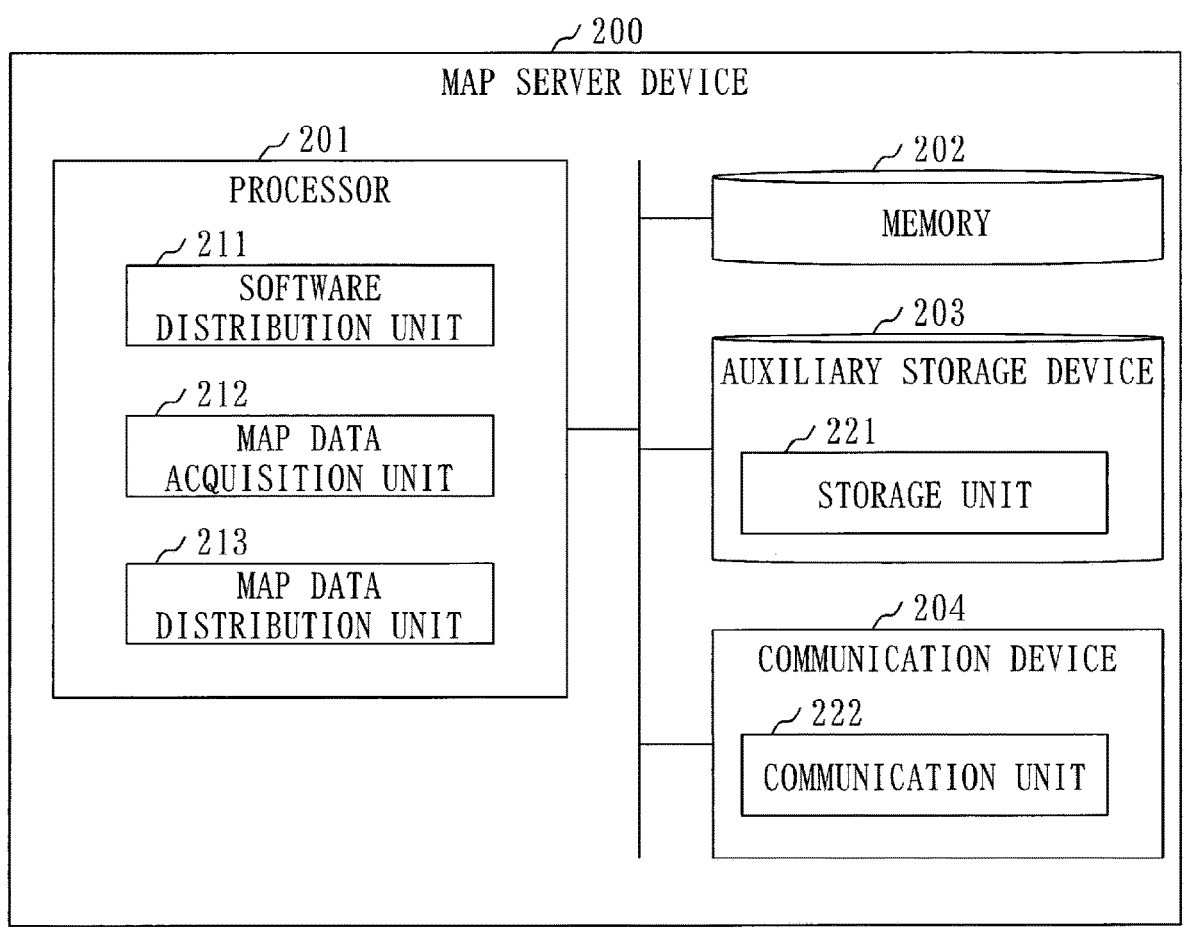
FIG. 3 is a configuration diagram of a map server device 200 according to the first embodiment.

The configuration of the map server device 200 is described based on FIG. 3.

The map server device 200 is a computer including hardware components such as a processor 201, a memory 202, an auxiliary storage device 203 and a communication device 204. These hardware components are connected to one another via signal lines.

The processor 201 is an IC (Integrated Circuit) that performs arithmetic processing, and controls other hardware components. For example, the processor 201 is a CPU (Central Processing Unit), a DSP (Digital Signal Processor) or a GPU (Graphics Processing Unit).

The memory 202 is a volatile storage device. The memory 202 is also called a main storage device or a main memory. For example, the memory 202 is a RAM (Random Access Memory). The data stored in the memory 202 is saved in the auxiliary storage device 203 as needed.

The auxiliary storage device 203 is a non-volatile storage device. For example, the auxiliary storage device 203 is a ROM (Read Only Memory), an HDD (Hard Disk Drive) or a flash memory. The data stored in the auxiliary storage device 203 is loaded into the memory 202 as needed.

The communication device 204 is a receiver/transmitter. For example, the communication device 204 is a communication chip or an NIC (Network Interface Card).

The map server device 200 includes elements such as a software distribution unit 211, a map data acquisition unit 212 and a map data distribution unit 213. These elements are realized by software.

The auxiliary storage device 203 stores a map server program to make a computer function as the software distribution unit 211, the map data acquisition unit 212, the map data distribution unit 213, a storage unit 221 and a communication unit 222. The map server program is loaded into the memory 202, and executed by the processor 201.

Further, the auxiliary storage device 203 stores an OS (Operating System). At least a part of the OS is loaded into the memory 202, and executed by the processor 201.

That is, the processor 201 executes the map server program while executing the OS.

The data obtained by executing the map server program is stored in a storage device such as the memory 202, the auxiliary storage device 203, a register in the processor 201 or a cache memory in the processor 201.

The auxiliary storage device 203 functions as a storage unit 221. However, another storage device may function as the storage unit 221 instead of the auxiliary storage device 203, or along with the auxiliary storage device 203.

The communication device 204 functions as the communication unit 222.

The map server program 200 may include a plurality of processors which replace the processor 201. The plurality of processors share the roles of the processor 201.

The map server program can be recorded (stored) on a non-volatile recording medium such as an optical disk or a flash memory, etc. in a computer-readable manner.

Figure 4:
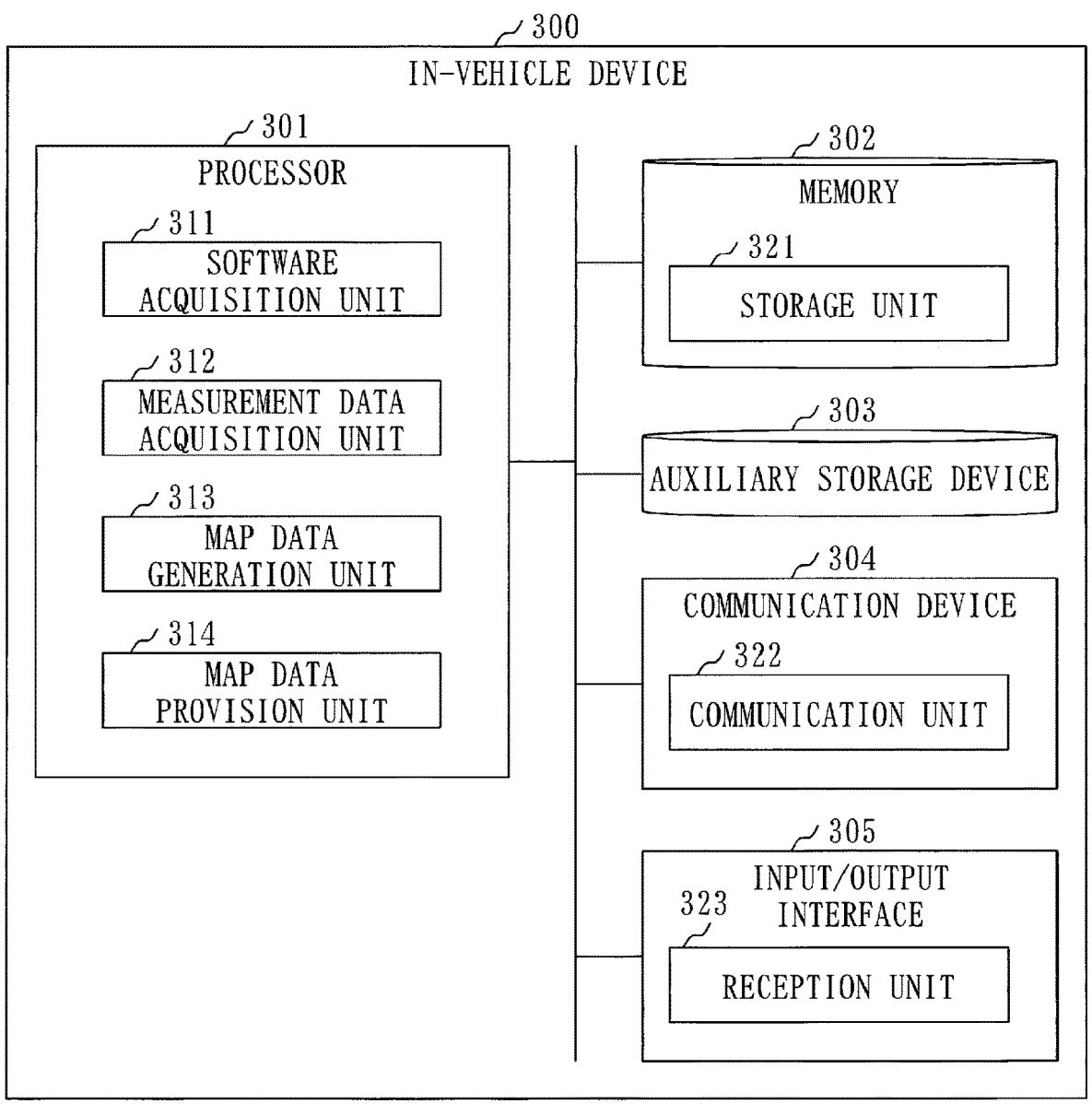
FIG. 4 is a configuration diagram of an in-vehicle device 300 according to the first embodiment.

The configuration of the in-vehicle device 300 will be described based on FIG. 4.

The in-vehicle device 300 is a computer including hardware components such as a processor 301, a memory 302, an auxiliary storage device 300, a communication device 304 and an input/output interface 305. These hardware components are connected to one another via signal lines.

The processor 301 is an IC to perform arithmetic processing, which controls other hardware components. For example, the processor 301 is a CPU, a DSP or a GPU.

The memory 302 is a volatile storage device. The memory 302 is also called a main storage device or a main memory. For example, the memory 302 is a RAM. The data stored in the memory 302 is saved in an auxiliary storage device 303 as needed.

The auxiliary storage device 303 is a non-volatile storage device. For example, the auxiliary storage device 303 is a ROM, an HDD or a flash memory. The data stored in the auxiliary storage device 303 is loaded into the memory 302 as needed.

The communication device 304 is a receiver and a transmitter. For example, the communication device 304 is a communication chip or an NIC.

The input/output interface 305 is a port through which data is input and output. For example, the input/output interface 305 is a USB terminal. USB is an abbreviation for Universal Serial Bus.

The in-vehicle device 300 includes elements such as a software acquisition unit 311, a measurement data acquisition unit 312, a map data generation unit 313 and a map data provision unit 314. These elements are realized by software.

The auxiliary storage device 303 stores an in-vehicle program to make a computer function as the software acquisition unit 311, the measurement data acquisition unit 312, the map data generation unit 313, the map data provision unit 314, a communication unit 322 and a reception unit 323. The in-vehicle program is loaded into the memory 302, and executed by the processor 301.

Further, the auxiliary storage device 303 stores an OS. At least a part of the OS is loaded into the memory 302, and executed by the processor 301.

That is, the processor 301 executes the in-vehicle program while executing the OS.

The data obtained by executing the in-vehicle program is stored in a storage device such as the memory 302, the auxiliary storage device 303, a register in the processor 301 or a cache memory in the processor 301.

The memory 302 functions as a storage unit 321. However, another storage device may function as the storage unit 321 instead of the memory 302, or along with the memory 302.

The communication device 304 functions as the communication unit 322.

The input/output interface 305 functions as the reception unit 323.

The in-vehicle device 300 may include a plurality of processors that replace the processor 301. The plurality of processors share the roles of the processor 301.

The in-vehicle program can be recorded (stored) on a non-volatile recording medium such as an optical disk or a flash memory, etc. in a computer-readable manner.

Explanation of Operations

Figure 5:
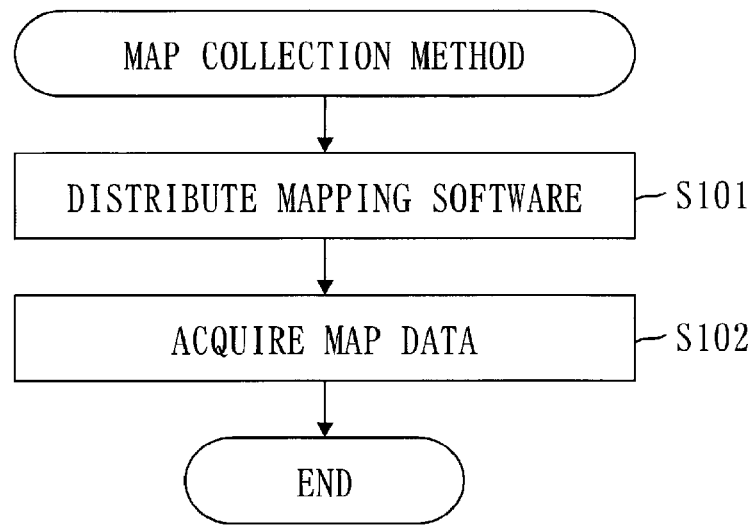
FIG. 5 is a flowchart of a map collection method by the map server device 200 according to the first embodiment.

A map collection method by the map server device 200 will be described based on FIG. 5.

In a step S101, the software distribution unit 211 distributes mapping software to in-vehicle devices 300 of each measurement vehicle 110.

The mapping software is a program to generate map data based on measurement data obtained by each measurement vehicle 110. For example, a conventional program to generate map data is used as mapping software.

The mapping software is stored beforehand in the storage unit 221.

Specifically, the software distribution unit 211 reads out the mapping software from the storage unit 221, and transmits the mapping software to the in-vehicle device 300 via the communication unit 222.

In a step S102, the map data acquisition unit 212 acquires map data.

Specifically, the in-vehicle devices 300 generate map data by executing the mapping software, and transmit the map data to the map server device 200. The map data acquisition unit 212 receives the map data transmitted from the in-vehicle devices 300 of each measurement vehicle 110 via the communication unit 222. Then, the map data acquisition unit 212 stores the map data in the storage unit 221.

After each map data is collected, the map data distribution unit 213 distributes each map data.

Specifically, an in-vehicle terminal mounted on a map using vehicle requests map data from the map server device 200. When the map data is requested, the map data distribution unit 213 reads out the map data from the storage unit 221. Then, the map data distribution unit 213 transmits the map data to the in-vehicle terminal being a requestor via the communication unit 222. The map using vehicles are various types of vehicles that use map data. The map using vehicle may be the measurement vehicle 110.

Map data is data corresponding to static information of a dynamic map, and is used for automatic driving or navigation.

A map provision method by the in-vehicle devices 300 will be described based on FIG. 6.

In a step S111, the software acquisition unit 311 acquires the mapping software from the map server device 200.

Specifically, the software acquisition unit 311 receives the mapping software transmitted form the map server device 200 via the communication unit 322. Then, the software acquisition unit 311 stores the mapping software in the storage unit 321.

In a step S112, the measurement data acquisition unit 312 acquires measurement data from the various types of sensors of the measurement vehicles 110.

Specifically, when measurement by the measurement vehicle 110 is started, the several types of sensors output measurement data. The output measurement data is input into the in-vehicle devices 300. The reception unit 323 receives the input measurement data, and the measurement data acquisition unit 312 acquires the measurement data via the reception unit 323. Then, the measurement data acquisition unit 312 stores the measurement data in the storage unit 321.

In a step S113, the map data generation unit 313 generates map data.

Specifically, the map data generation unit 313 executes the mapping software by using the measurement data as an input. Thereby, the map data is generated. The map data generation unit 313 stores the map data in the storage unit 321.

In a step S114, the map data provision unit 314 transmits the map data to the map server device 200 via the communication unit 322.

A map collection method by the map collection system 100 will be described based on FIG. 7.

In a step S121, the in-vehicle devices 300 request mapping software from the map server device 200.

Specifically, the software acquisition unit 311 transmits a software request to the map server device 200 via the communication unit 322.

The software request is communication data to request the mapping software.

In a step S122, the map server device 200 distributes the mapping software to the in-vehicle devices 300.

Specifically, the map server device 200 operates as follows.

The communication unit 222 receives a software request.

When the software request is received, the software distribution unit 211 reads out the mapping software from the storage unit 221.

Then, the software distribution unit 211 transmits a software response to the in-vehicle devices 300 via the communication unit 222.

The software response is communication data including the mapping software.

In a step S123, the in-vehicle devices 300 store the mapping software.

Specifically, the in-vehicle devices 300 operate as follows.

The communication unit 322 receives the software response.

When the software response is received, the software acquisition unit 311 acquires the mapping software from the software response.

Then, the storage unit 321 stores the mapping software.

In a step 5124, the in-vehicle devices 300 acquire measurement data_

Specifically, when measurement by a measurement vehicle 110 is started, the various types of sensors output the measurement data. The output measurement data is input into the in-vehicle devices 300. The reception unit 323 receives the input measurement data, and the measurement data acquisition unit 312 acquires the measurement data via the reception unit 323. Then, the storage unit 321 stores the measurement data.

In a step S125, the in-vehicle devices 300 generate map data.

Specifically, the map data generation unit 313 executes the mapping software by using the measurement data as an input. Thereby, the map data is generated. The storage unit 321 stores the map data.

In a step 5126, the in-vehicle devices 300 transmit the map data to the map server device 200.

Specifically, the map data provision unit 314 transmits the map data to the map server device 200 via the communication unit 322.

In a step S127, the map server device 200 stores the map data.

Specifically, the map data acquisition unit 212 receives the map data via the communication unit 222. Then, the storage unit 221 stores the map data.

Effect of First Embodiment

Figure 8:
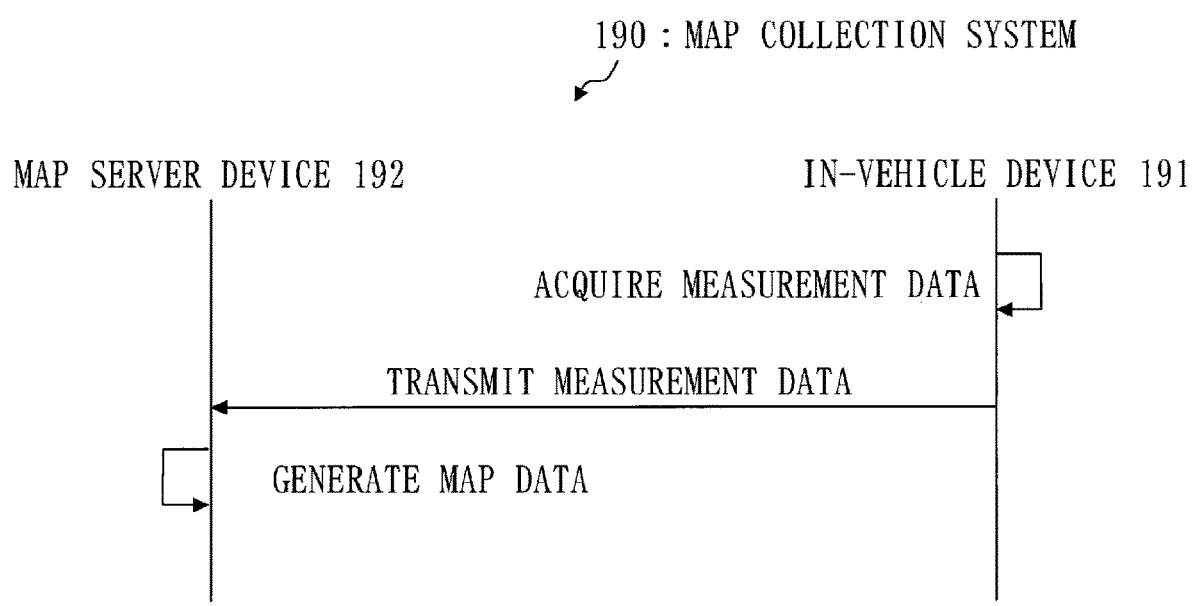
FIG. 8 is a flowchart of a map collection method in a map collection system 190.

A map collection method by a map collection system 190 will be described based on FIG. 8.

The map collection system 190 is a system to be compared with the map collection system 100.

First, an in-vehicle device 191 acquires measurement data from the various types of sensors of the measurement vehicles.

Next, the in-vehicle device 191 transmits the measurement data to a map server device 192. The map server device 192 receives the measurement data.

Then, the map server device 192 generates map data by executing the mapping software by using the measurement as an input.

That is, the map server device 192 acquires measurement data obtained in each area from the in-vehicle devices 300 of each measurement vehicle 110, and generates map data of each area based on the measurement data of the each area.

Meanwhile, in the first embodiment, the map server device 200 makes the in-vehicle devices 300 of each measurement vehicle 110 generate map data of each area by distributing the mapping software to the in-vehicle devices 300 of each measurement vehicle 110.

This makes it possible to distribute a load in generating the map data to the in-vehicle devices 300 of each measurement vehicle 110. Thereby, it is possible to reduce the load on the map server device 200.

The amount of the measurement data obtained by the measurement vehicles 110 is enormous. Meanwhile, the map data generated based on the measurement data is smaller than the measurement data.

In the map collection system 190, the data communicated between the map server device 192 and the in-vehicle device 191 is the measurement data.

Meanwhile, in the first embodiment, the data communicated between the map server device 200 and the in-vehicle devices 300 is the map data.

This makes it possible to reduce the amount of the data communicated between the map server device 200 and the in-vehicle devices 300.

The map server device 200 distributes common mapping software to the in-vehicle devices 300 of each measurement vehicle 110. This makes it possible to generate map data of each area in a common format.

Another Configuration

There may exist a map-related system.

The map-related system relays measurement data and map data between the map server device 200 and the in-vehicle devices 300. The measurement data and the map data are communicated via the map-related system.

For example, the map-related system is a system that is used by a map company, a car company or a navigation system company, etc. In addition, the map-related system is a system used by, for example, a logistics company, a taxi company, a bus company, or a home delivery company.

Second Embodiment

A form in which automatic transmission and automatic deletion of map data is performed in the in-vehicle devices 300 will be described mainly on points different from those in the first embodiment based on FIG. 9 through FIG. 12.

Explanation of Configuration

The configuration of the map collection system 100 is the same as the configuration in the first embodiment (refer to FIG. 1).

Figure 2:
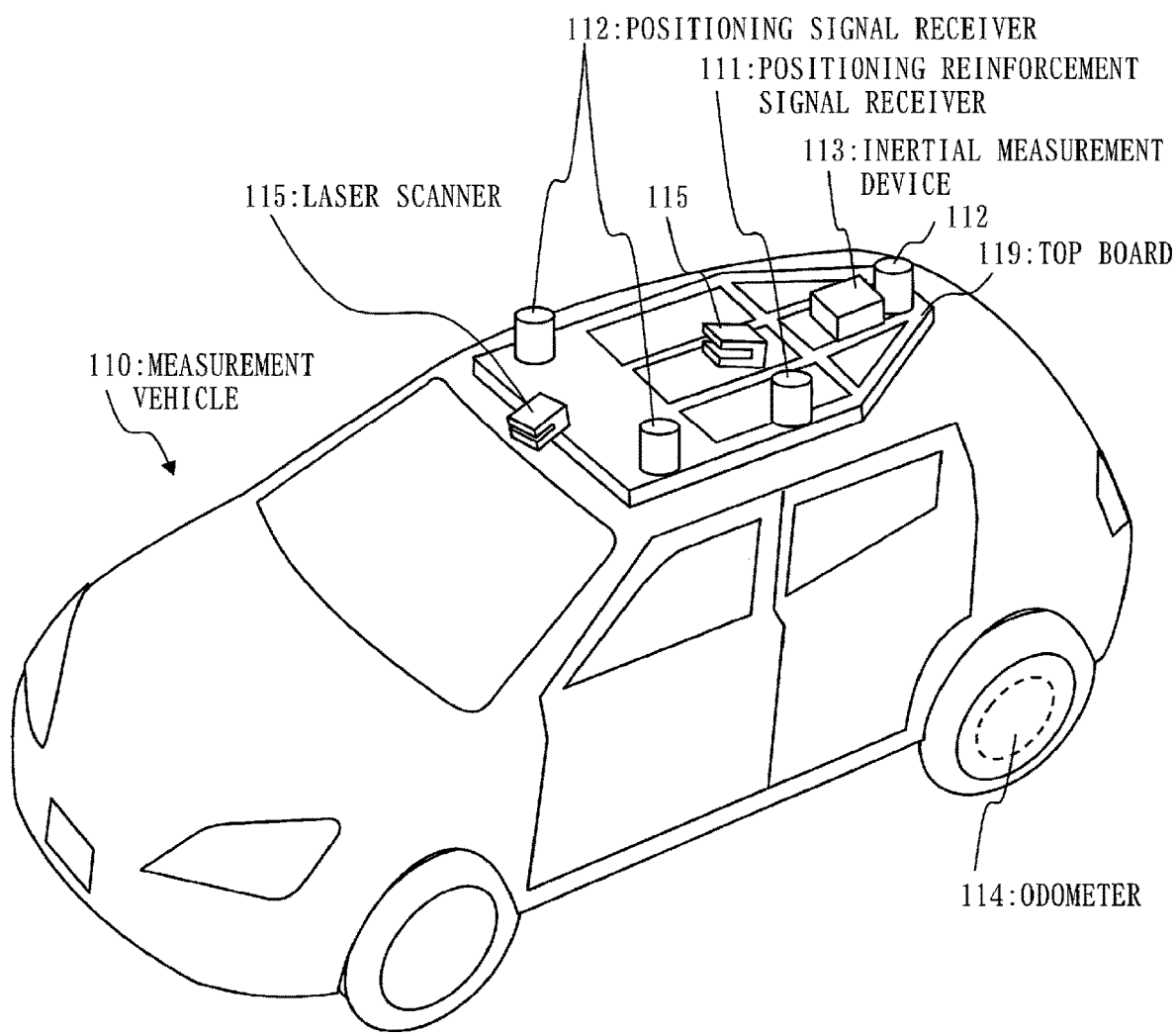
FIG. 2 is a configuration diagram of a measurement vehicle 100 according to the first embodiment.

The configuration of the map server device 200 is the same as the configuration in the first embodiment (refer to FIG. 2).

Figure 9:
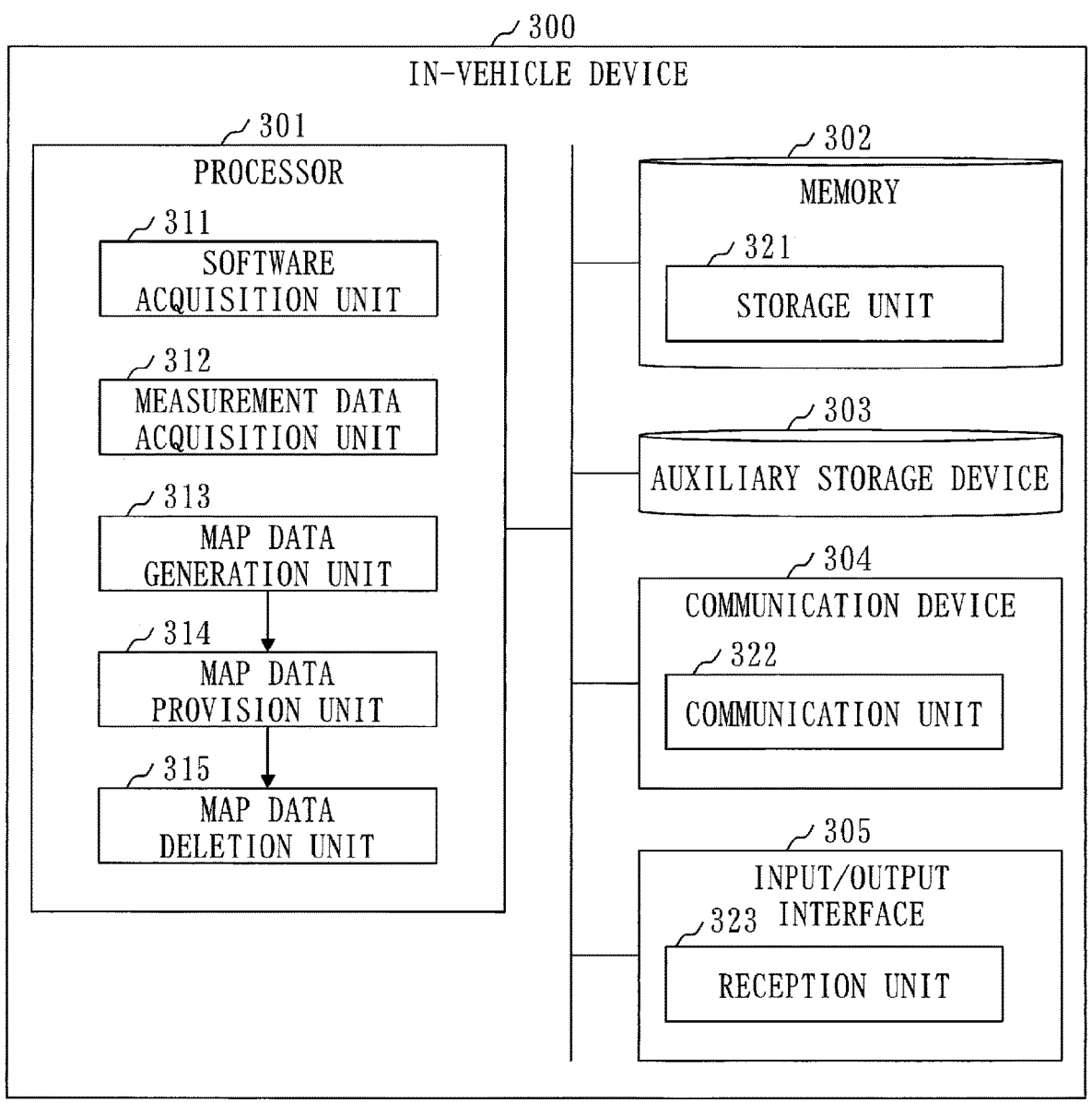
FIG. 9 is a configuration diagram of an in-vehicle device 300 according to a second embodiment.

The configuration of an in-vehicle device 300 will be described based on FIG. 9.

The in-vehicle device 300 further includes a map data deletion unit 315.

Figure 10:
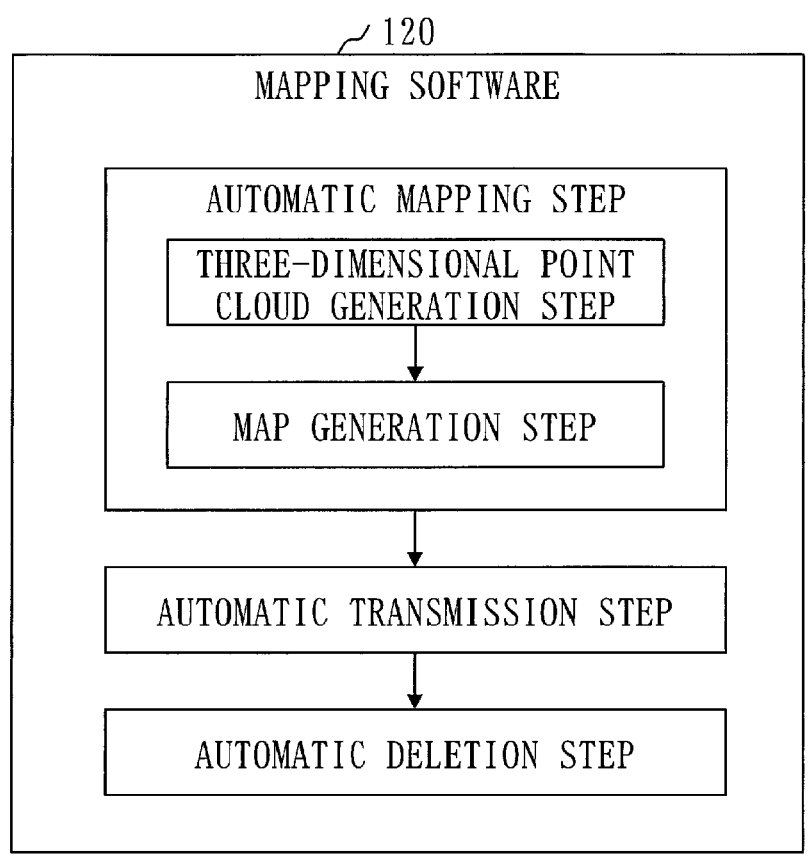
FIG. 10 is a diagram illustrating a procedure of mapping software 120 according to the second embodiment.
Figure 11:
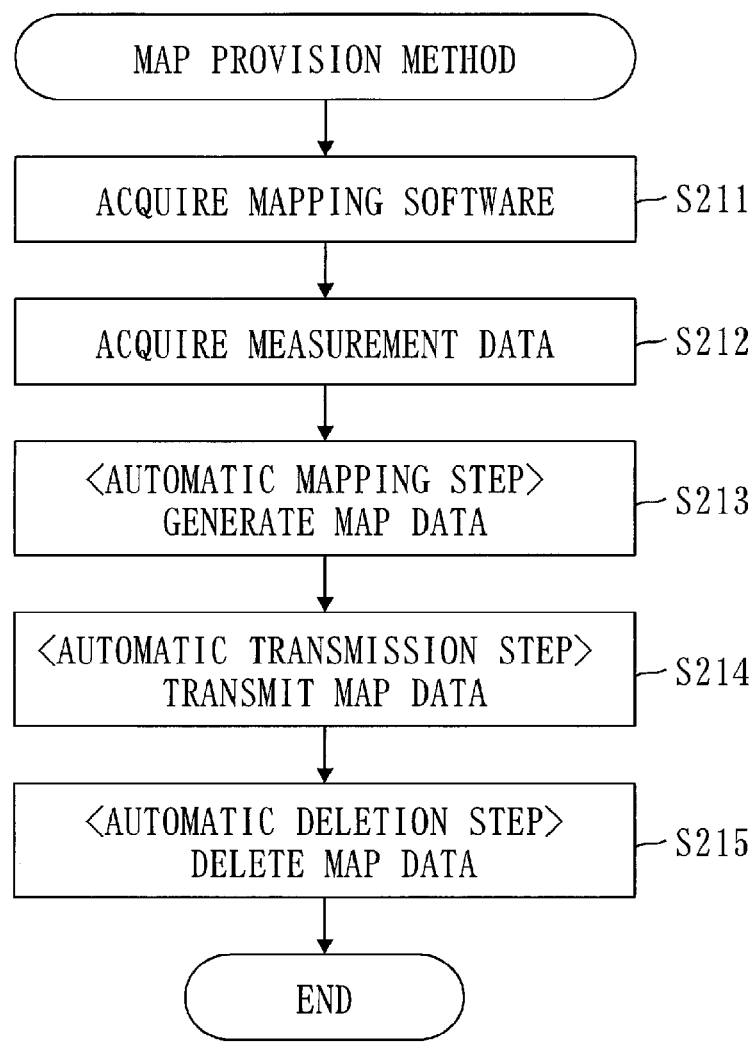
FIG. 11 is a flowchart of a map provision method by the in-vehicle device 300 according to the second embodiment.

The procedure described in the mapping software 120 will be described based on FIG. 10.

In the mapping software 120, a series of procedures are described as an algorithm.

The series of procedures include an automatic mapping step, an automatic transmission step and an automatic deletion step.

The automatic mapping step is a step to generate map data based on measurement data. The map data generated is stored in the storage unit 321.

The automatic transmission step is a step to transmit the generated map data to the map server device 200.

The automatic deletion step is a step to delete the generated map data from the storage unit 321 when the generated map data is transmitted to the map server device 200.

The automatic mapping step includes a three-dimensional point cloud generation step and a map generation step.

The three-dimensional point cloud generation step is a step to generate three-dimensional point cloud data based on the measurement data. The three-dimensional point cloud data indicates three-dimensional coordinate values of each measurement point.

The map generation step is a step to generate map data based on the three-dimensional point cloud data.

Description of Operation

A map collection method by the map server device 200 is the same as the method (refer to FIG. 5) in the first embodiment.

A map provision method by the in-vehicle devices 300 will be described based on FIG. 10.

Figure 6:
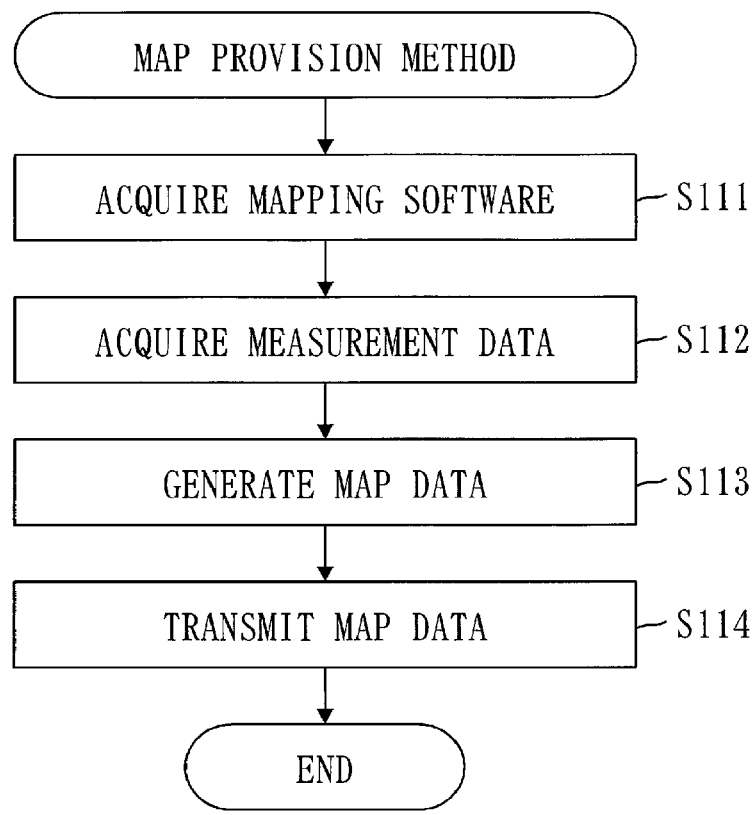
FIG. 6 is a flowchart of a map provision method by the in-vehicle device 300 according to the first embodiment.

A step S211 through a step S214 are the same as the step S111 through the step S114 in the first embodiment (refer to FIG. 6).

The step S213 is an automatic mapping step.

The step S214 is an automatic transmission step.

A step S215 is an automatic deletion step.

In the step S215, the map data deletion unit 315 deletes map data from the storage unit 321.

Figure 12:
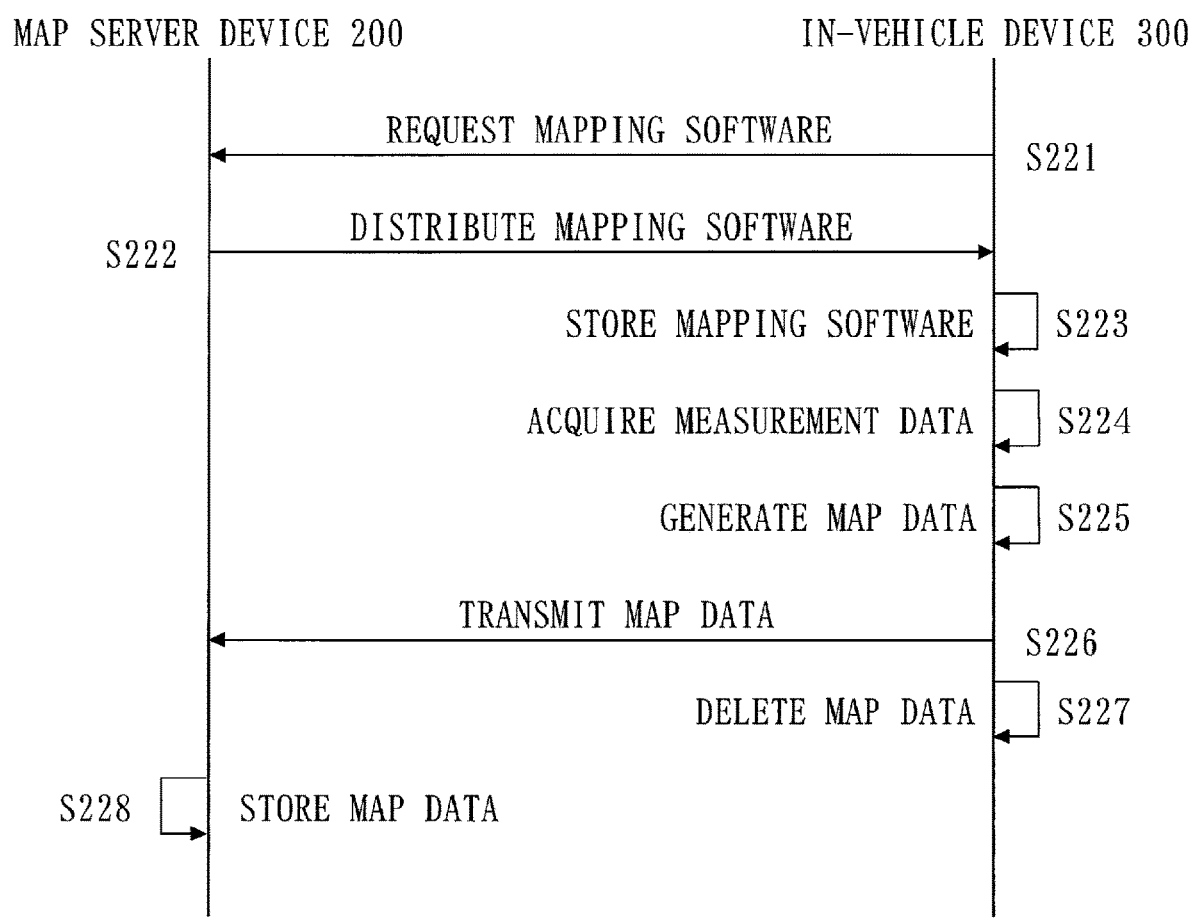
FIG. 12 is a flowchart of a map collection method by a map collection system 100 according to the second embodiment.

A map collection method by the map collection system 100 will be described based on FIG. 12.

Figure 7:
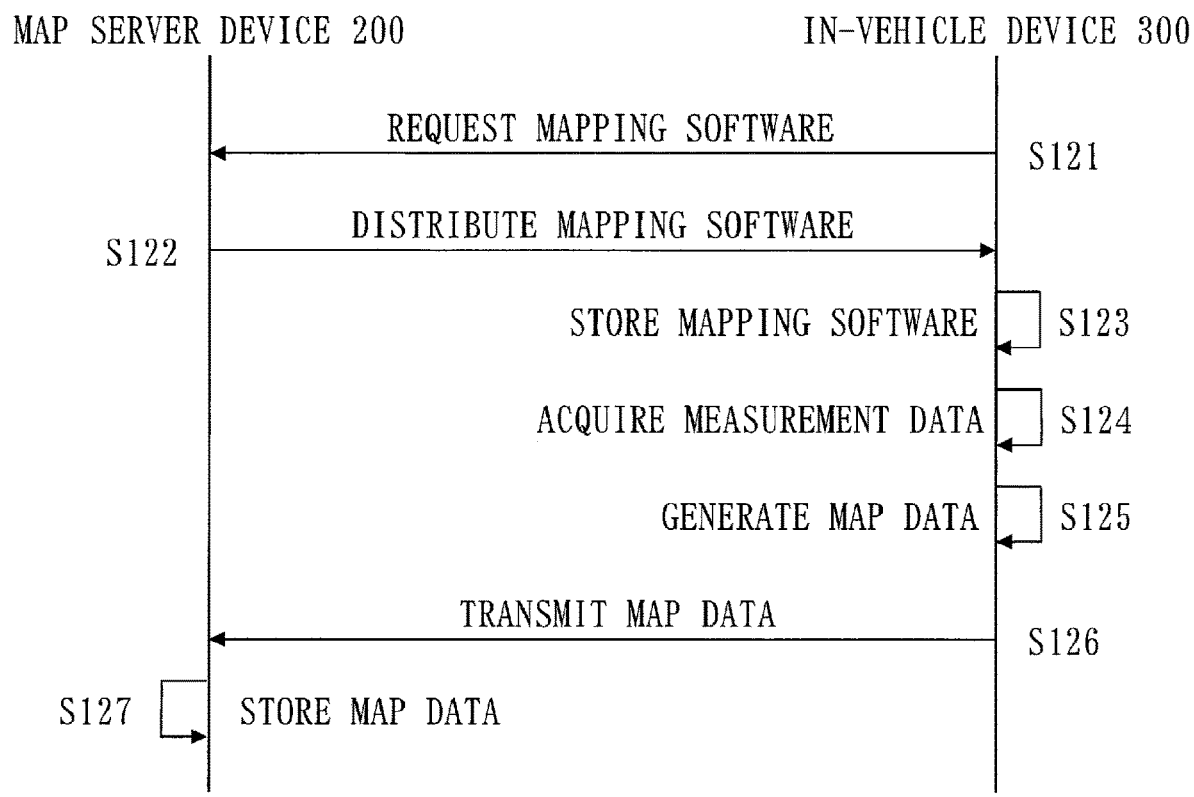
FIG. 7 is a flowchart of a map collection method by the map collection system 100 according to the first embodiment.

A step S221 through a step S226 are the same as the step S121 through the step S126 in the first embodiment (refer to FIG. 7).

The step S225 is an automatic mapping step.

The step S226 is an automatic transmission step.

A step 5227 is an automatic deletion step.

In the step S227, the map data deletion unit 315 deletes map data from the storage unit 321.

A step S228 is the same as the step S127 in the first embodiment (refer to FIG. 7).

Effect of Second Embodiment

By the mapping software 120, map data is automatically transmitted from the in-vehicle devices 300 to the map server device 200. Then, when the map data is transmitted, the map data is automatically deleted from the storage unit 321. This makes it possible to prevent leakage of the map data.

Supplement to Embodiments

Figure 13:
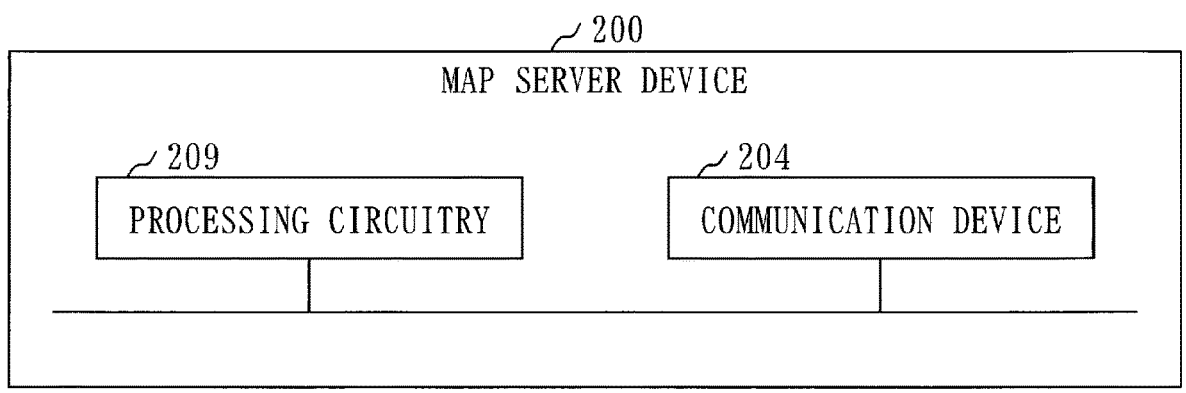
FIG. 13 is a diagram illustrating a hardware configuration of the map server device 200 according to the embodiments.

A hardware configuration of the map server device 200 will be described based on FIG. 13.

The map server device 200 includes processing circuitry 209.

The processing circuitry 209 is a hardware component to realize the software distribution unit 211, the map data acquisition unit 212 and the map data distribution unit 213.

The processing circuitry 209 may be a dedicated hardware component, or may be the processor 201 to execute programs stored in the memory 202.

When the processing circuitry 209 is a dedicated hardware component, the processing circuitry 209 is, for example, a single circuit, a composite circuit, a programmed processor, a parallel-programmed processor, an ASIC, an FPGA, or a combination thereof.

ASIC is an abbreviation for Application Specific Integrated Circuit, and FPGA is an abbreviation for Field Programmable Gate Array.

The map server device 200 may include a plurality of processing circuits that replace the processing circuitry 209. The plurality of processing circuits share the roles of the processing circuitry 209.

In the map server device 200, part of the functions may be realized by a dedicated hardware component, and the remaining functions may be realized by software or firmware.

As described above, it is possible to realize the processing circuitry 209 by a hardware component, software, firmware or a combination thereof.

Figure 14:
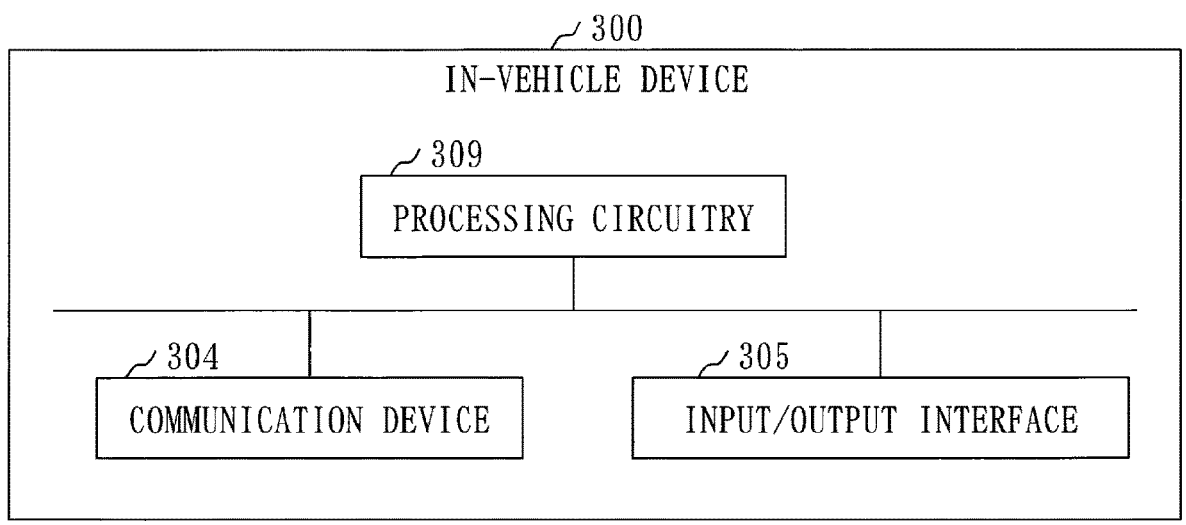
FIG. 14 is a diagram illustrating a hardware configuration of the in-vehicle device 300 according to the embodiments.

A hardware configuration of the in-vehicle devices 300 will be described based on FIG. 14.

An in-vehicle device 300 includes processing circuitry 309.

The processing circuitry 309 is a hardware component to realize the software acquisition unit311, the measurement data acquisition unit 312, the map data generation unit 313, the map data provision unit 314 and the map data deletion unit 315.

The processing circuitry 309 may be a dedicated hardware component, or may be a processor 301 to execute programs stored in the memory 302.

When the processing circuitry 309 is a dedicated hardware component, the processing circuitry 309 is, for example, a single circuit, a composite circuit, a programmed processor, a parallel-programmed processor, an ASIC, an FPGA, or a combination thereof.

The in-vehicle device 300 may include a plurality of processing circuits that replace the processing circuitry 309. The plurality of processing circuits share the roles of the processing circuitry 309.

In the in-vehicle devices 300, part of the functions may be realized by a dedicated hardware component, and the remaining functions may be realized by software or firmware.

As described above, the processing circuitry 309 may be realized by a hardware component, software, firmware or a combination thereof.

The present embodiments are examples of preferable embodiments, and are not aimed at limiting a technical range of the present invention. The present embodiments may be partially performed, or may be performed by being combined with another embodiment. The procedures described by using flowcharts, etc., may be altered suitably.

Each device described in the present embodiments may be realized by a plurality of devices. That is, each device described in the present embodiments may be realized as a system.

Each element of the devices described in the present embodiments may be realized by any of software, hardware, or firmware, or any combination thereof.

"Unit" may be read as "process" or "step."

REFERENCE SIGNS LIST

100: map collection system; 101: network; 110: measurement vehicle; 111: positioning reinforcement signal receiver; 112: positioning signal receiver; 113: inertial measurement device; 114: odometer; 115: laser scanner; 119: top board; 120: mapping software; 190: map collection system; 191: in-vehicle device; 192: map server device; 200: map server device; 201: processor; 202: memory; 203: auxiliary storage device; 204: communication device; 209: processing circuitry; 211: software distribution unit; 212: map data acquisition unit; 213: map data distribution unit; 221: storage unit; 222: communication unit; 300: in-vehicle device; 301: processor; 302: memory; 303: auxiliary storage device; 304: communication device; 305: input/output interface; 309: processing circuitry; 311: software acquisition unit; 312: measurement data acquisition unit; 313: map data generation unit; 314: map data provision unit; 315: map data deletion unit; 321: storage unit; 322: communication unit; 323: reception unit

The invention claimed is:

1. A map collection system comprising a map server device, and an in-vehicle device that is mounted on a measurement vehicle,
   wherein the map server device includes processing circuitry configured to:
      receive a request for mapping software from the in-vehicle device,
      distribute, to the in-vehicle device, the mapping software to generate three-dimensional point cloud data indicating three-dimensional coordinate values of each measurement point based on measurement data, to obtain linearized data of roads and features of roads from the three-dimensional point cloud data, and to generate map data including the linearized data of roads and the features of roads,
   wherein the measurement data includes (i) positioning data specifying a position of the measurement vehicle, (ii) inertial measurement data specifying angles and angular velocities in three-axial directions of the measurement vehicle and acceleration rates in the three-axial directions of the measurement vehicle, (iii) travel distance data specifying a distance traveled by the measurement vehicle based on a rotating radius of a tire and a rotation amount of a wheel of the measurement vehicle, and (iv) azimuth-distance data specifying a distance to a measurement point from the measurement vehicle based on a measured time, and wherein the mapping software is distributed to the in-vehicle device in response to the request, and
      acquire, from the in-vehicle device, the map data generated by the mapping software, and
   wherein the in-vehicle device includes a storage and processing circuitry configured to:
      transmit the request for the mapping software to the map server device,
      acquire the mapping software from the map server device in response to the request,
      acquire the measurement data obtained by the measurement vehicle,
      obtain the linearized data of roads and the features of roads from the three-dimensional point cloud data,
      automatically generate map data by executing the mapping software using the acquired measurement data as an input,
      generate a dynamic map based on the generated map data,
      store the generated map data in the storage,
      automatically transmit the generated map data to the map server device, and
      automatically delete all of the generated map data from the storage in response to transmitting the generated map data to the map server device, wherein the generated map data is data corresponding to static information of the dynamic map that identifies lanes of roads and is used for controlling navigation and automatic driving by vehicles, wherein the measurement data is acquired by the in-vehicle device from a plurality of sensors of each of a plurality of measurement vehicles including the measurement vehicle, wherein the map data generated based on the measurement data is smaller than the measurement data, and wherein the mapping software is standardized among a plurality of in-vehicle devices of respective ones of the plurality of measurement vehicles so as to cause each of the plurality of in-vehicle devices to generate the map data in a common format.

2. The map collection system according to claim 1, wherein the mapping software is configured to generate the linearized data of the roads and the features of the roads from the measurement data acquired from the plurality of sensors.

3. A map server device comprising:
processing circuitry configured to:
receive a request for mapping software from an in-vehicle device,
distribute, to the in-vehicle device mounted on a measurement vehicle, the mapping software to generate three-dimensional point cloud data indicating three-dimensional coordinate values of each measurement point based on measurement data, to obtain linearized data of roads and features of roads from the three-dimensional point cloud data, and to generate map data including the linearized data of roads and the features of roads,
wherein the measurement data includes (i) positioning data specifying a position of the measurement vehicle, (ii) inertial measurement data specifying angles and angular velocities in three-axial directions of the measurement vehicle and acceleration rates in the three-axial directions of the measurement vehicle, (iii) travel distance data specifying a distance traveled by the measurement vehicle based on a rotating radius of a tire and a rotation amount of a wheel of the measurement vehicle, and (iv) azimuth-distance data specifying a distance to a measurement point from the measurement vehicle based on a measured time, and wherein the mapping software is distributed to the in-vehicle device in response to the request, and
acquire, from the in-vehicle device, the map data automatically generated by the mapping software,
wherein the generated map data is data corresponding to static information of a dynamic map that identifies lanes of roads and is used for controlling navigation and automatic driving by vehicles,
wherein the dynamic map is generated by the in-vehicle device based on the map data,
wherein all of the generated map data is automatically deleted from a storge of the in-vehicle device in response to the in-vehicle device transmitting the generated map data to the map server device,
wherein the measurement data is acquired by the in-vehicle device from a plurality of sensors of each of a plurality of measurement vehicles including the measurement vehicle,
wherein the map data generated based on the measurement data is smaller than the measurement data, and wherein the mapping software is standardized among a plurality of in-vehicle devices of respective ones of the plurality of measurement vehicles so as to cause each of the plurality of in-vehicle devices to generate the map data in a common format.

4. An in-vehicle device that is mounted on a measurement vehicle, the in-vehicle device comprising:
a storage; and
processing circuitry configured to:
transmit a request for mapping software to a map server device,
acquire the mapping software to generate three-dimensional point cloud data indicating three-dimensional coordinate values of each measurement point based on measurement data, to obtain linearized data of roads and features of roads from the three-dimensional point cloud data, and to generate map data including the linearized data of roads and the features of roads,
wherein the measurement data includes (i) positioning data specifying a position of the measurement vehicle, (ii) inertial measurement data specifying angles and angular velocities in three-axial directions of the measurement vehicle and acceleration rates in the three-axial directions of the measurement vehicle, (iii) travel distance data specifying a distance traveled by the measurement vehicle based on a rotating radius of a tire and a rotation amount of a wheel of the measurement vehicle, and (iv) azimuth-distance data specifying a distance to a measurement point from the measurement vehicle based on a measured time,
acquire the measurement data obtained by the measurement vehicle,
obtain the linearized data of roads and the features of roads from the three-dimensional point cloud data,
automatically generate map data by executing the mapping software using the acquired measurement data as an input,
generate a dynamic map based on the generated map data,
store the generated map data in the storage,
automatically transmit the generated map data to the map server device, and
automatically delete all of the generated map data from the storage in response to transmitting the generated map data to the map server device,
wherein the generated map data is data corresponding to static information of the dynamic map that identifies lanes of roads and is used for controlling navigation and automatic driving by vehicles,
wherein the measurement data is acquired by the in-vehicle device from a plurality of sensors of each of a plurality of measurement vehicles including the measurement vehicle,
wherein the map data generated based on the measurement data is smaller than the measurement data, and
wherein the mapping software is standardized among a plurality of in-vehicle devices of respective ones of the plurality of measurement vehicles so as to cause each of the plurality of in-vehicle devices to generate the map data in a common format.

5. A map collection method comprising:
transmitting, by an in-vehicle device mounted on a measurement vehicle, a request for mapping software to a map server device;

receiving, by the map server device, the request for the mapping software from the in-vehicle device;

transmitting, by the map server device, to the in-vehicle device, the mapping software to generate three-dimensional point cloud data indicating three-dimensional coordinate values of each measurement point based on measurement data, to obtain linearized data of roads and features of roads from the three-dimensional point cloud data, and to generate map data including the linearized data of roads and the features of roads, wherein the measurement data includes (i) positioning data specifying a position of the measurement vehicle, (ii) inertial measurement data specifying angles and angular velocities in three-axial directions of the measurement vehicle and acceleration rates in the three-axial directions of the measurement vehicle, (iii) travel distance data specifying a distance traveled by the measurement vehicle based on a rotating radius of a tire and a rotation amount of a wheel of the measurement vehicle, and (iv) azimuth-distance data specifying a distance to a measurement point from the measurement vehicle based on a measured time, and wherein the mapping software is distributed to the in-vehicle device in response to the request;

receiving, by the in-vehicle device, the mapping software from the map server device, acquiring the measurement data obtained by the measurement vehicle, obtaining the linearized data of roads and the features of roads from the three-dimensional point cloud data, automatically generating map data by executing the mapping software using the acquired measurement data as an input, generating a dynamic map based on the generated map data, automatically transmitting the generated map data to the map server device, and automatically deleting all of the generated map data from a storage of the in-vehicle device in response to transmitting the generated map data to the map server device, and receiving, by the map server device, the generated map data from the in-vehicle device, wherein the generated map data is data corresponding to static information of the dynamic map that identifies lanes of roads and is used for controlling navigation and automatic driving by vehicles, wherein the measurement data is acquired by the in-vehicle device from a plurality of sensors of each of a plurality of measurement vehicles including the measurement vehicle, wherein the map data generated based on the measurement data is smaller than the measurement data, and wherein the mapping software is standardized among a plurality of in-vehicle devices of respective ones of the plurality of measurement vehicles so as to cause each of the plurality of in-vehicle devices to generate the map data in a common format.

* * * * *